United States Patent [19]
Ricks

[11] 3,738,122
[45] June 12, 1973

[54] TORQUE COUPLER

[76] Inventor: Tom E. Ricks, 4306 Durango, Odessa, Tex. 79760

[22] Filed: Aug. 24, 1971

[21] Appl. No.: 174,367

[52] U.S. Cl. .................... 64/29, 64/30 R, 192/51 R
[51] Int. Cl. ............................................. F16d 7/00
[58] Field of Search .................. 64/29, 30 R, 28 R; 192/56 R

[56] References Cited
UNITED STATES PATENTS

| | | | |
|---|---|---|---|
| 2,778,468 | 1/1957 | Babaian | 192/56 R |
| 2,870,886 | 1/1959 | Wood et al. | 64/29 |
| 2,983,122 | 5/1961 | Polzin | 64/29 |

*Primary Examiner*—Charles J. Myhre
*Assistant Examiner*—Randall Heald
*Attorney*—Clarence A. O'Brien and Harvey B. Jacobson

[57] ABSTRACT

A pair of telescopingly engaged sleeves including concentric axially opposing cylindrical portions end edge abutted against each other. The sleeves include remote ends with one of the remote ends being adapted for stationary securement to a first shaft portion and the other of the remote ends being adapted for keying to another shaft portion generally axially aligned with the first shaft portion and for rotation with an axial shifting relative to the other shaft portion. The abutting end edges of the cylindrical portions includes circumferentially spaced coacting cam lobes for camming the opposing cylindrical portions axially apart in response to relative rotation of the sleeves and a central spring is connected between the sleeves and yieldingly biases the latter toward further telescopingly engaged positions and with the opposing cylindrical portions thereof in end abutted relation.

8 Claims, 5 Drawing Figures

PATENTED JUN 12 1973 3,738,122

Tom E. Ricks
INVENTOR.

BY Clarence A.O'Brien
and Harvey B. Jacobson
Attorneys

TORQUE COUPLER

The torque coupler of the instant invention has been designed primarily as a means for coupling a drive shaft to a driven shaft and may be used in substantially any similar installation as long as the coupler is not excessively overloaded. However, the coupler is designed to automatically interrupt the driving connection between the associated drive and driven shafts in the event a predetermined torque transfer through the coupling is exceeded.

In addition, the coupler also includes lockout means whereby once the coupler is overloaded it may be automatically locked in a release condition, which operation can be to an advantage when the coupler is utilized on equipment that is unattended. Still further, the coupler may be operatively associated with suitable control means operatively connected to the associated prime mover in a manner such that actuation of the coupler to an overload condition may effect shutdown of the prime mover.

The main object of this invention is to provide an overload coupling for use in coupling a drive shaft to a driven shaft and including means whereby the drive connection between the drive shaft and the driven shaft may be at least momentarily interrupted in the event of an overload.

Another object of this invention, in accordance with the immediately preceding object, is to provide a torque coupler including automatic lockout means whereby the coupler may be locked in its overload condition as a result of experiencing the initial overload condition.

Yet another object of this invention is to provide a torque coupler constructed in a manner whereby vibratory minimal overload conditions will not be effective to cause the coupler to shift to an overload condition.

A final object of this invention to be specifically enumerated herein is to provide a torque coupler in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
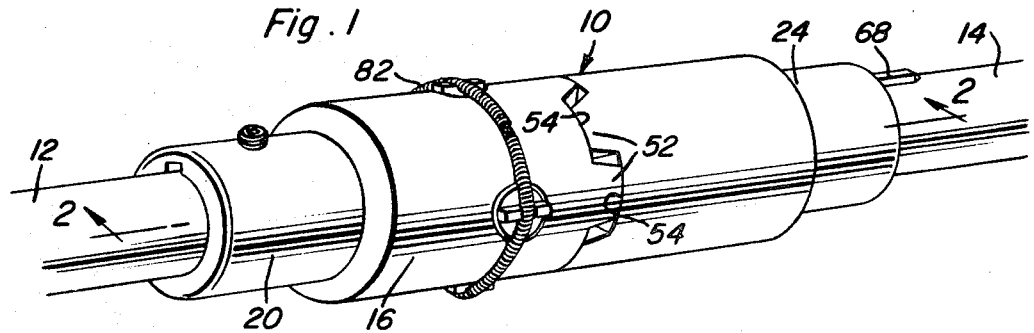
FIG. 1 is a perspective view of the torque coupler in use drivingly coupling a driving shaft to a driven shaft.
Figure 2:
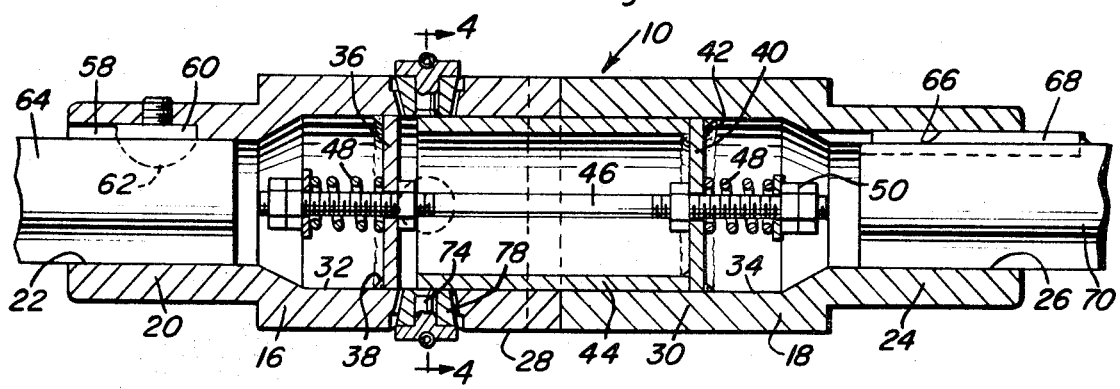
FIG. 2 is an enlarged fragmentary sectional view taken substantially upon a plane indicated by section line 2—2 of FIG. 1.
Figure 3:
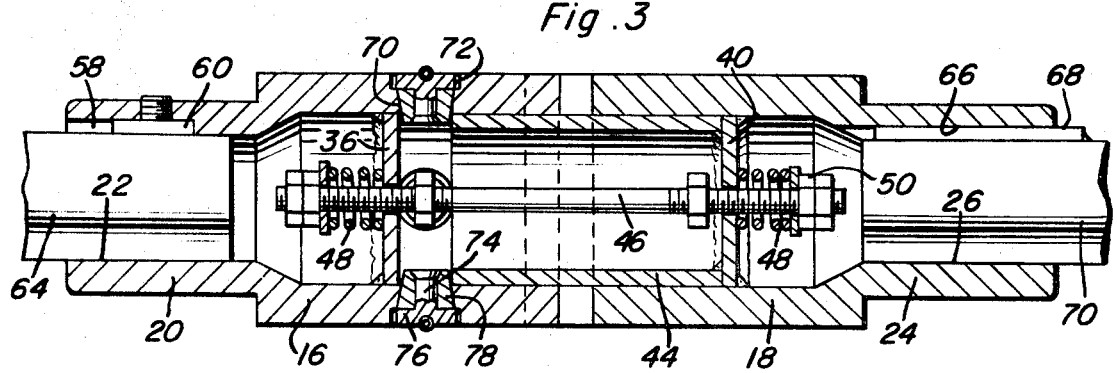
FIG. 3 is a longitudinal sectional view similar to FIG. 2 but illustrating the torque coupler in the overload condition.
Figure 4:
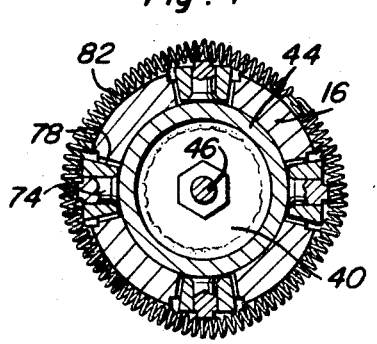
FIG. 4 is a transverse sectional view taken substantially upon a plane indicated by section line 4—4 of FIG. 2.
Figure 5:
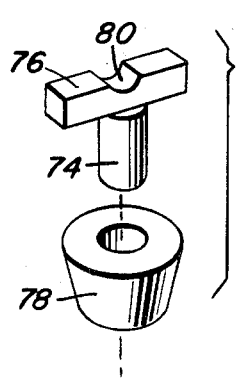
FIG. 5 is an exploded view of one of the overload lockout pins and its associated bearing.

Referring now more specifically to the drawings the numeral 10 generally designates the torque coupler of the instant invention which is illustrated in FIGS. 1 and 2 of the drawings as coupling a driving shaft 12 to a driven shaft 14.

The coupler 10 includes a first drive sleeve or hub 16 and a second driven hub or sleeve 18. The hub 16 includes a small diameter end portion 20 having a bore 22 formed therethrough and the sleeve 18 includes a first small diameter end portion 24 having a bore 26 formed therethrough. The small diameter end portions of the sleeves 16 and 18 are disposed furthest from each other and the adjacent ends of the sleeves 16 and 18 define large diameter end portions 28 and 30, respectively. The end portion 28 has a counterbore 32 formed therein and the end portion 30 has a counterbore 34 formed therein.

The end portions 28 and 30 are of substantially the same diameter and of substantially the same wall thickness. The counterbore 32 has a centrally apertured partition 36 secured therein by welding 38 and a similarly centrally apertured partition 40 is secured within the counterbore 34 by means of welding 42.

Secured within the counterbore 34 and to the partition 40 is a guide sleeve 44 and the end of the guide sleeve 44 remote from the partition 40 projects endwise outwardly of the open end of the counterbore 34 and is rotatably and slidably telescopingly received in the open end of the counterbore 32 whereby the sleeves 16 and 18 are journaled relative to each other.

A retaining bolt 46 is secured through the centrally apertured partitions 36 and 40 and has a pair of compression springs 48 disposed thereon on the remote sides of the partitions 36 and 40 and secured in position by means of suitable threaded fasteners 50. Accordingly, the compression springs 48 serve to yieldingly bias the sleeves 16 and 18 toward each other.

The confronting end edges of the end portions 28 and 30 include circumferentially spaced axial projections 52 which define therebetween recesses 54 in which the projections 52 are receivable. The circumferential extent of each projection 52 is less than the circumferential extent of a corresponding recess 54 and the projections and recesses are generally truncated coned shaped in side elevation. Thus, the projections 52 comprise cams whereby an excessive torque load being transferred by the coupling 10 will cause relative rotation between the sleeves 16 and 18 and thus cause end portions 28 and 30 to be cammed apart.

The bore 22 is provided with a keyway 58 in which a Woodruff key 60 is received and the Woodruff key 60 is seated in a recess 52 provided therefor in a driving shaft 64 telescoped within the bore 22. On the other hand, the bore 26 includes a keyway 66 and a key 68 shiftable longitudinally in the keyway 66 is carried by a driven shaft 70 slidably received within the bore 26. Accordingly, when the coupler experiences a torque overload the cams or projections 52 cam the sleeves 16 and 18 apart axially shifting the sleeve 18 along the shaft 70 away from the shaft 64 until the projections 52 are cammed out of the recesses 54. At this point, a drive connection between the shaft 64 and the shaft 70 is interrupted.

In addition, the end portion 28 includes four circumferentially spaced radial bores 70 having outer counterbores 72 and a plurality of bearing retainer shafts 74 including diametric crossheads 76 are positioned with their heads 76 received in the counterbores 72 and have bearing members 78 journaled thereon with the bearings 78 received within the counterbores 70. The heads 76 are provided with center transverse grooves 80 and an elongated expansion spring 82 is disposed about the sleeve 16 and has longitudinally spaced portions seated in the grooves 80 whereby the bearing retainer shafts 74 are urged radially inwardly toward positions thereof in which the corresponding crossheads 76 are seated in the counterbores 72. However, when this occurs, the bearings 78 are projected inwardly of the inner ends of the bores 70 and move into axial registry with the end face of the guide sleeve 44 remote from the partition 40 whereby the guide sleeve 44 may abut against the bearings 78 to retain the coupler 10 in an overload condition.

The bearings 78 are truncated cone shaped and they are capable, under the biasing action of the spring 82, of further separating the sleeves 16 and 18 to thereby insure that the projections 52 will not have any portions thereof projecting into and out of the recesses.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A torque coupler including a pair of end aligned sleeve members including adjacent and remote ends, one of said remote ends being adapted for removable stationary securement to a first shaft portion and the other remote end being adapted for keying to a second shaft portion for rotation therewith and axial shifting relative thereto, said adjacent ends including axially projecting and circumferentially spaced projections defining axially opening recesses therebetween, the projections on one sleeve member being seated in the recesses of the other sleeve member, means connected between said sleeve members urging the latter toward each other, a journal sleeve secured in the adjacent end of one of said sleeve members and rotatably journalled in the adjacent end of the other sleeve member, whereby said sleeve members are journaled for rotation relative to each other, said projections and recesses including coacting cam surfaces operative to cam said adjacent ends away from each other in response to relative rotation of said sleeve members, said means connected between said sleeve members including elongated tension means extending along the center axes of said sleeve members within the latter.

2. A torque coupler including a pair of end aligned sleeve members including adjacent and remote ends, one of said remote ends being adapted for removable stationary securement to a first shaft portion and the other remote end being adapted for keying to a second shaft portion for rotation therewith and axial shifting relative thereto, said adjacent ends including axially projecting and circumferentially spaced projections defining axially opening recesses therebetween, the projections on one sleeve member being seated in the recesses of the other sleeve member, means connected between said sleeve members urging the latter toward each other, a journal sleeve secured in the adjacent end of one of said sleeve members and rotatably journalled in the adjacent end of the other sleeve member, whereby said sleeve members are journaled for rotation relative to each other, said projections and recesses including coacting cam surfaces operative to cam said adjacent ends away from each other in response to relative rotation of said sleeve members, said sleeve members including centrally apertured partitions recessed inwardly of said adjacent ends, said means connected between said sleeve members comprising an elongated tension member extending between and passed through said centrally apertured partitions, coiled compression spring means disposed on at least one end of said tension member on the side of the corresponding partition remote from the other end of said tension member, a compression spring means retaining abutment secured on said one end of said tension member with said compression spring means disposed between said one partition and said abutment member, and means securing the other end of said tension member through said other partition.

3. The combination of claim 2 including a second coiled compression spring means disposed on the other end of said tension member on the side of said other partition remote from said one partition, and a second abutment member on said second end of said tension member with said second coil spring means disposed between said second abutment member and the adjacent partition.

4. The combination of claim 1 including means operative to automatically retain said sleeve members in axially spaced apart relation in response to said sleeve members being cammed apart by said cam surfaces as a result of relative rotation of said sleeve members.

5. A torque coupler including a pair of end aligned sleeve members including adjacent and remote ends, one of said remote ends being adapted for removable stationary securement to a first shaft portion and the other remote end being adapted for keying to a second shaft portion for rotation therewith and axial shifting relative thereto, said adjacent ends including axially projecting and circumferentially spaced projections defining axially opening recesses therebetween, the projections on one sleeve member being seated in the recesses of the other sleeve member, means connected between said sleeve members urging the latter toward each other, a journal sleeve secured in the adjacent end of one of said sleeve members and rotatably journalled in the adjacent end of the other sleeve member, whereby said sleeve members are journaled for rotation relative to each other, said projections and recesses including coacting cam surfaces operative to cam said adjacent ends away from each other in response to relative rotation of said sleeve members, means operative to automatically retain said sleeve members in axially spaced apart relation in response to said sleeve members being cammed apart by said cam surfaces as a result of relative rotation of said sleeve members, said means operative to automatically retain said sleeve members in axially spaced relation include a plurality of radially shiftable lockout members supported from said other sleeve for radial shifting between outer positions with the radial innermost portions of said lockout members retracted outwardly of the interior of said other sleeve and inner positions with said lockout members projecting into the interior of said other sleeve, the end of said journal sleeve telescoped and rotatably received in said other sleeve member being shiftable longitudinally of the latter passed the radial innermost portions of said lockout members in response to said projections being cammed out of said recesses as a result of relative rotation of said sleeve members, and means yieldingly biasing said lockout members radially inwardly of said other sleeve member.

6. The combination of claim 5 wherein the innermost portions of said lockout members define shaft portions extending generally radially of said other sleeve member, and a plurality of bearing rollers journaled on said shaft portions and disposed at least partially in the interior of said other sleeve member when said lockout members are disposed in their radial innermost positions for engagement of the end of said journal sleeve therewith.

7. The combination of claim 6 wherein said sleeve members include centrally apertured partitions recessed inwardly of said adjacent ends, said means connected between said sleeve members comprising an elongated tension member extending between and passed through said centrally apertured partitions, coiled compression spring means disposed on at least one end of said tension member on the side of the corresponding partition remote from the other end of said tension member, a compression spring means retaining abutment secured on said one end of said tension member with said compression spring means disposed between said one partition and said abutment member, and means securing the other end of said tension member through said other partition.

8. The combination of claim 7 including a second coiled compression spring means disposed on the other end of said tension member on the side of said other partition remote from said one partition, and a second abutment member on said second end of said tension member with said second coil spring means disposed between said second abutment member and the adjacent partition.

* * * * *